Patented July 26, 1932

1,868,531

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

OXIDATION OF DERIVATIVES OF FLUORENE

No Drawing. Application filed December 13, 1928. Serial No. 325,932.

This invention relates to the oxidation of fluorene derivatives.

In the past it has been proposed to oxidize fluorene to fluorenone by means of catalysts containing oxides of the metals of the fifth and sixth groups of the periodic system, such as vanadium oxide. This process has proved very unsatisfactory both from the standpoint of yields and quality of product obtained. Much better results may be obtained by using as catalysts salts of the metal acids of the fifth and sixth groups of the periodic system, as described in my co-pending application Serial No. 310,438, filed October 4, 1928, and still better results are obtained by using stabilized catalysts, more particularly stabilized catalysts containing base exchange bodies, as described and claimed in my co-pending application Serial No. 310,679, filed October 25, 1928.

I have found that excellent results may be obtained by starting not with fluorene itself but with its derivatives and more particularly its dehydrogenation products, such as bisdiphenylene-ethylene or bisdiphenylene-ethane (difluorenyl). These dehydrogenation products, which can be readily prepared from fluorene with almost quantitative yields, appear to be oxidized more smoothly and easily than fluorene itself and excellent yields of fluorenone of a very high grade of purity and when suitable catalysts are used practically chemically pure fluorenone can be obtained.

The present invention possesses the advantage that impure fluorenes when transformed into their dehydrogenation products are at the same time purified so that it is possible to start with a raw material which is pure and it is probable that this is an important factor in the greater smoothness and simplicity of the oxidation of the present invention. Throughout the specification and claims the expression "dehydrogenated fluorenes" will be used to cover both disdiphenylene-ethylene and difluorenyl and it has been found that these two products are substantially equivalent as raw materials in the present process. The present invention is, of course, not limited to the oxidation of the simple hydrocarbons but substituted, dehydrogenated fluorenes such as those containing halogen may also be oxidized, producing the corresponding substituted fluorenones.

The present invention can be carried out either with stabilized or unstabilized catalysts and it is an important advantage of the present invention that it can even be carried out with the relatively inefficient metal oxide catalysts which have been proposed in the past for the oxidation of fluorene. The reason why these commercially practically worthless catalysts can be used in the present invention is not definitely known but it seems probable that one of the reasons lies in the fact that the raw material in the present invention is substantially pure in contrast to the relatively impure fluorene used in the older processes. Probably also the dehydrogenation renders the compounds more readily oxidized at the carbon atom where dehydrogenation has taken place and it is thus possible to work under conditions which are less drastic. There may, however, be other factors which account for the effectiveness of the process of the invention and it is, of course, in no sense limited to the above theory which is merely presented as the best explanation in the light of present knowledge.

While it is an important advantage of the present invention that even the inefficient metal oxide catalysts may be used, better results are obtained when catalysts containing salts of the metal acids of the fifth and sixth groups of the periodic system are used. They may be salts of the alkali or alkaline earth metals or heavy metals such as iron, silver, manganese, aluminum, nickel, cobalt, copper, chromium, titanium, zirconium, thorium, cerium, etc. While any of the salts of the metal acids of the fifth or sixth groups of the periodic system may be used, I have found that vanadates, vanadites and molybdates or mixtures of them are the most effective. Salts of the other metal acids, although less effective, are frequently desirable additions to the more active salts referred to above. Complex salts, such as the highly porous, puffed vanadyl vanadates, particularly those of the copper, silver and alkali metals may be used and constitute some of the most effective contact masses owing to the extremely fine porous structure produced when the salt is formed, in most cases with the evolution of oxygen. The use of puffed vanadyl vanadates or similar complex compounds, some of which are base exchange bodies and some of which are not, for organic oxidations generally is not claimed in the present application, this forming the subject matter of my co-pending application, Serial No. 339,742 filed February 13, 1929.

Particularly effective catalysts are those which contain stabilizers, that is to say compounds of the alkali and alkaline earth metals and of some of the strongly basic earth metals whose oxides are not readily reducible with hydrogen. These stabilizers appear to tone the catalytically effective components of the contact mass and to stabilize its action, exerting what might be called a selective poisoning in that the tendency of the catalyst to total combustion and to undesired side reactions is more strongly poisoned or damped than its activity in the oxidation of dehydrogenated fluorenes to fluorenone. When suitable stabilizers are used, it is possible to use vanadium oxide or similar metal oxide catalysts with results which are far superior to those obtainable with the oxide catalysts alone and approach those possible with salts of the metal acids of the fifth and sixth groups of the periodic system. In addition to the presence of stabilizers, it is frequently advantageous to incorporate other catalytically active components which are not specific catalysts for the oxidation of hydrogenated fluorenes to fluorenones, but which have catalytic activity for other reactions, either for other oxidations or catalytic reactions of another type, such as dehydrogenations, dehydrations, condensations, etc. These non-specific catalytically active components will be referred to throughout the specification as "stabilizer promoters" as they appear to enhance the stabilizing action of the stabilizers. The invention, however, in no sense is limited to any theory of action of these non-specific catalysts.

The oxidation of organic compounds generally by means of stabilized catalysts with or without stabilizer promoters is described and claimed in my prior Patent No. 1,709,853, dated April 23, 1929. It should be understood that any of the stabilized contact masses described in the above referred to application as suitable for the oxidation of fluorene or of acenaphthene substances, anthracene to anthraquinone or toluol to benzoic acid may be used in the present invention.

While the most various types of stabilized contact masses give satisfactory results in the process of the present invention, I have found that stabilized contact masses which contain base exchange bodies, either silicious or non-silicious, or their derivatives, which are the salt-like bodies and leached base exchange bodies, are particularly effective, both by reason of the high molecular weight of the complex molecules involved, which distribute in a most desirably homogeneous manner the catalytically effective radicals or atoms and by the physical characteristics of high porosity and surface energy, excellent resistance to high temperatures encountered in the catalysis, etc. These base exchange contact masses or those containing derivatives, are described and claimed for the oxidation of organic compounds generally in my Patent No. 1,694,122, issued December 4, 1928, and my prior Patents Nos. 1,735,763, dated November 12, 1929 and 1,722,297, dated July 30, 1929 and application No. 294,597, filed July 21, 1928. Any of the contact masses mentioned in the above referred to applications as suitable for the oxidation of fluorene or acenaphthene, or for the oxidation of anthracene to anthraquinone, or toluol to benzoic acid may be used in the present invention. Throughout the specification and claims, products which are either base exchange bodies or the derivatives of base exchange bodies defined above will be referred to as "permutogenetic bodies", and it should be understood that this term will have no other meaning in the specification and claims.

While the present invention can be carried out using air alone as an oxidizing gas or other gases containing oxygen, such as mixtures of carbon dioxide and oxygen, it is advantageous in many cases to carry out the oxidation in the presence of steam, which appears to exert a favorable influence on the reaction. It should, therefore, be understood that the present invention may be carried out with or without the presence of steam. The use of steam in the oxidation of fluorene substances is, however, not claimed broadly in the present invention, but forms the subject matter of my co-pending application, Serial No. 316,364, filed October 31, 1928.

The dehydrogenated fluorenes which form the raw material of the present invention may be prepared and isolated before use, or if desired fluorenes may be dehydrogenated and the reaction products without isolation may be further oxidized according to the present invention, with or without the addition of further oxygen-containing gases or of diluent gases such as steam and the like. The combined process, in which fluorenes are first dehydrogenated and then immediately oxidized, presents certain advantages in economy of space and apparatus but it presents the disadvantage that the raw material is not as pure as when the dehydrogenated fluorenes are first separated and then oxidized by means of the present invention.

The impurities, which may consist of hydrogen, water vapor, carbon dioxide and the like, depending on the conditions of dehydrogenation, are sometimes not harmful, and in the case of production of water vapor may even be advantageous. The combined process may be carried out in two converters, or it may be carried out in a single converter using two layers of catalyst, the first acting as a dehydrogenation catalyst and the second being an oxidation catalyst.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

The invention will be illustrated in greater detail in connection with the following specific examples which illustrate a few typical embodiments of the invention without, however, limiting its scope to the precise details therein set forth.

Example 1

A solution of ammonium metavanadate containing 10 parts of $V_2O_5$ is impregnated into 200 volumes of 8-10 mesh pumice fragments which are then calcined with hot air, transforming the ammonium metavanadate into vanadium pentoxide. The contact mass is filled into a suitable converter and if desired the calcination may take place in the converter itself. Bisdiphenylene-ethylene or diflurorenyl is uniformly vaporized in an air stream in the ratio of 1:30 by weight and passed over the contact mass at 360–400° C. Good yields of fluorenone are obtained. The temperature of the reaction should be accurately controlled and it is advantageous although by no means essential that the reaction be carried out in tubular converters with small catalyst tubes, for example 3/4" internal diameter and 9–12" catalyst depth, surrounded by a temperature regulating bath. This bath may advantageously be mercury or preferably a mercury alloy which boils at the desired temperature. Mercury may be used alone but in such a case it is necessary to cause it to boil under pressure which renders it less satisfactory than alloy baths and also greatly increases the expense. Examples of mercury alloys are alloys of mercury and cadmium, or mercury and lead. An alloy of the latter containing 30 parts of mercury to 70 parts of lead is very satisfactory.

Example 2

18.2 parts of $V_2O_5$ are dissolved in 250 parts of a potassium hydroxide solution containing 22.6 parts of KOH. 27 parts of ferric sulfate are dissolved in 300 parts of water at 50–60° C. and the potassium vanadate solution is poured into the hot solution with vigorous agitation. The yellow precipitate of ferric vanadate which is obtained is filtered by suction, washed with water until the wash water is colorless and then the wet cake is sludged in 200 parts of water and the suspension coated uniformly onto 500 volumes of 8–12 mesh pumice fragments by spraying the suspension onto a carrier material which is agitated, for example in a revolving spray pan, and heated to a sufficiently high temperature so that the water of the suspension is vaporized immediately on striking the carrier material. The contact mass thus obtained is filled into a converter and blown with air at 350–400° C. and is then ready for use.

Dehydrogenated fluorene is uniformly vaporized in an air stream in the ratio of 1:30 by weight and passed over the contact mass at 360–400° C. Good yields of fluorenone of excellent purity are obtained. The temperature should be accurately controlled and the reaction may advantageously be carried out in a converter such as that described in Example 1.

Instead of using a ferric pyrovanadate contact mass as described above, other iron salts of vanadic acid or complex compounds of vanadic acid and iron may be used. Part or all of the vanadic acid may also be replaced by one or more of the acids of the metal elements of the fifth and sixth groups of the periodic system, such as molybdenum, tungsten, uranium, chromium, tantalum or columbium. Some of these contact masses produce small amounts of phthalic anhydride and maleic acid in addition to fluorenone and these impurities may be easily separated and if present in sufficient amount can be recovered and utilized. When a contact mass is used or the reaction conditions are such that phthalic anhydride and maleic acid are obtained, it is particularly desirable to use steam because in the presence of steam the phthalic anhydride is transformed into phthalic acid at about 191° C., which compound is non-volatile. It is thus possible, by careful cooling of the exhaust gases when steam is used, to remove practically all of the phthalic anhydride and in some cases maleic acid. The use of steam is also desirable in increasing the yields and smoothing the reaction and may be varied within wide limits. The introduction may be in the form of steam, or wet air may be used.

Instead of iron salts of metal acids of the fifth and sixth groups of the periodic system, other salts may be substituted partly or wholly, such as those of copper, nickel, cobalt, silver, aluminum, titanium, zirconium, manganese or cerium.

The pumice fragments may, of course, be replaced by other carriers such as roughened quartz fragments, fragments of quartz filter stones, sand stones, "Celite" bricks, natural or artificial silicates, base exchange bodies, especially zeolites prepared either by fusion or wet methods and in the latter case preferably diluted with materials rich in silica, metal granules such as aluminum granules or granules of metal alloys such as ferrosilicon, ferrovanadium, and the like.

Instead of oxidizing dehydrogenated fluorenes, halogen substituted dehydrogenated fluorenes may be oxidized under the same reaction conditions, the products of course being halogen substituted fluorenone.

*Example 3*

300 parts of $V_2O_5$ are intimately mixed with about 94 parts of silver nitrate and melted. The melt is permitted to cool and during cooling puffs up to form the porous vanadyl vanadate with evolution of large quantities of oxygen. The puffed product is then broken into pea sized fragments and is ready for use. If desired, diluents such as kieselguhr may be incorporated into the melt in order to produce a diluted silver vanadyl vanadate contact mass.

Dehydrogenated fluorenes are uniformly vaporized with air and steam in the proportion of 1:30:10 by weight and passed over the silver vanadyl vanadate contact mass at 370–390° C. Good yields of fluorenone of high purity are obtained. The silver vanadyl vanadate may be replaced partly or wholly with corresponding amounts of sodium, potassium, lithium, rubidium, or cæsium vanadyl vanadates. The desirable ratios of $V_2O_5$ to the basic oxides for the different vanadyl vanadates are as follows:

$V_2O_5$ to $Na_2O$ as 6:1

$V_2O_5$ to $K_2O$ as 5:1

$V_2O_5$ to $Li_2O$ as 2:1

$V_2O_5$ to $Rb_2O$ as 5:1

$V_2O_5$ to $Cs_2O$ as 5:1

It should be noted that most of these vanadyl vanadates are base exchange bodies and are, therefore, to be classed as non-silicious base exchange bodies. Where they contain alkali metal, of course, the contact masses are stabilized.

*Example 4*

18.2 parts of $V_2O_5$ are dissolved in 250 parts of potassium hydroxide solution containing 22.6 parts of KOH. 27 parts of ferric sulfate are dissolved in 300 parts of water at 50–60° C., and the potassium vanadate solution is then poured in with vigorous agitation. The yellow precipitate of ferric pyrovanadate which is obtained is filtered with suction, washed with water until the wash water is colorless, and then the wet cake is sludged with 200 parts of water, to which suspension 35 parts of $K_2SO_4$ dissolved in 250 parts of water are added. The suspension is then coated uniformly onto 500 volumns of 8–12 mesh pumice fragments by spraying the suspension onto the agitated carrier material, for example in a revolving spray pan, the material being maintained at a temperature sufficiently high so that the water of the suspension is immediately vaporized on striking the carrier fragments.

The potassium sulfate acts as a stabilizer in the contact mass, and may be replaced partly or wholly by one or more other compounds of the alkali or alkaline earth metal groups, such as for example potassium nitrate, potassium nitrite, potassium bisulfate, potassium chloride, potassium bromide, calcium sulfate, manganese sulfate, or the corresponding compounds of lithium, sodium, rubidium, cæsium, etc.

The amounts of stabilizers used may be varied within wide limits, and will depend to some extent on the stabilizers selected.

The contact mass is filled into a converter which may, for example, be of the type described in Example 1.

Dehydrogenated fluorenes are uniformly vaporized into an air stream in the ratio of 1:25 by weight and passed over the contact mass at 380–420° C., giving yields up to 80% of the theory of fluorenone of high purity.

Instead of carrying out the reaction with air alone the dehydrogenated fluorenes may be vaporized into an air stream containing steam, which permits greater ranges of reaction temperatures and higher loadings. When steam is used fluorenone of extremely high purity may be obtained at about 400° C. The vanadium in the contact mass may be partly or wholly replaced by other elements, such as the other metal elements of the fifth and sixth groups of the periodic system, for example molybdenum, tungsten, uranium, chromium, columbium and tantalum. Instead of iron salts salts of cobalt, nickel, copper, silver, aluminum, titanium, zirconium or cerium may be used, singly or in admixture.

The pumice fragment carriers may be replaced with other carrier material, such as for example roughened fragments of quartz, quartz filter stones, sand stones, "Celite" bricks, fragments of natural or artificial silicates, base exchange bodies such as zeolites, especially those prepared by fusion methods, metal granules such as those of aluminum or metal alloys such as ferrosilicon, ferrovanadium and the like.

*Example 5*

1,000 parts of a natural base exchange body or a diluted or undiluted artificial base exchange body made by wet or fusion methods are treated with 5-10% metal salt solutions such as ferric sulfate, cobalt nitrate, nickel sulfate, copper sulfate, silver nitrate, aluminum sulfate, manganese sulfate, vanadyl sulfate, chromium nitrate, singly or in admixture, in order to exchange a maximum of the exchangeable alkali. The treatment may take place by trickling the solutions over the base exchange body at 40-50° C. After base exchange has been completed the products are treated with water soluble compounds of the metal acids of the fifth and sixth groups of the periodic system, such as a solution of ammonium vanadate or ammonium molybdate, in order to form with the base exchange bodies the so-called salt-like bodies. These derivatives are then calcined with 7% $SO_2$ gases or gases containing a corresponding amount of $SO_3$ at 400-500° C.

Dehydrogenated fluorenes are uniformly vaporized with air in various ratios, such as for example 1:35 by weight, and are passed over the contact mass at 370-420° C. Good yields of fluorenone of high purity are obtained. The reaction conditions, such as the temperature, time of contact, loading of the catalyst, proportion of dehydrogenated fluorenes to oxidizing gases used, etc., may be varied within wide limits.

In addition to these variations oxygen containing diluent gases such as carbon dioxide and nitrogen may be present. Steam as a diluent is especially advantageous, particularly where the fluorenone is accompanied by impurities such as phthalic anhydride and maleic acid. The use of steam not only smooths out the reaction conditions and permits higher loadings, but the acid products, particularly phthalic anhydride, can be readily separated in the presence of steam. Thus, for example, it is only necessary to cool the reacted gases down to a temperature below 191° C. in the presence of steam to transform the phthalic anhydride into the non-volatile phthalic acid which separates out from the gas stream. Instead of using steam in the reaction itself it may, of course, be introduced into the gas stream after the latter leaves the converter, in which case it aids only in the separation of impurities which can be rendered non-volatile in the presence of steam.

The oxidation of dehydrogenated fluorenes with the above contact mass can be carried out in tubular bath converters as described in connection with Example 1, or it may be carried out in converters provided with reaction gas cooling, which increases its cooling effect in direct proportion with the amount of reaction gases passing through the so-called automatic heat exchange converters. The exotherm can be effectively controlled with or without recirculation of reacted products, and good yields of fluorenone can be obtained.

Example 6

200 parts of 33° Bé. potassium waterglass solution diluted with 600-800 parts of water are mixed with sufficient kieselguhr or "Celite" brick refuse until the solution just remains easily stirrable. 18 parts of $V_2O_5$ are reduced by means of sulfur dioxide in a hot aqueous solution acidified with sulfuric acid, blue vanadyl sulfate being produced which is then transformed into a brown solution of potassium vanadite by treatment with sufficient 10 N. caustic potash solution. A 5-10% solution of a mixture of ferrous sulfate and manganese sulfate in the ratio of 3:1 is prepared. The waterglass suspension and vanadite solution are mixed together and the ferrous-manganese sulfate solution is then added in a thin stream with vigorous agitation until the reaction mixture becomes neutral to phenolphthalein or just alkaline. The mass solidifies to a dirty greenish gel, which is filtered with suction, washed three times with 100 volumes of water and dried, constituting a diluted multi-component zeolite which contains tetravalent vanadium, iron and manganese in non-exchangeable form.

Instead of suspending the diluent in the waterglass it may be suspended in the potassium vanadite solution, or the vanadite and waterglass solutions may be mixed and the diluent then added. The vanadite solution may also be replaced partly or wholly by corresponding amounts of a potassium vanadite solution, which may be obtained by directly dissolving $V_2O_5$ in 2 N. caustic potash. This solution may also be partly or wholly replaced by other metallates of the fifth and sixth groups of the periodic system, such as potassium tungstate.

Instead of using a mixture of ferrous and manganese sulfates other metal salt solutions, such as, for example, solutions containing one or more salts of copper, nickel, cobalt, iron or aluminum, may be used.

After drying the zeolite may be transformed by base exchange or by the formation of salt-like bodies as described in the foregoing example. If base exchange is to be effected it is desirable to first hydrate the zeolite by trickling water over it. Among the elements which may be introduced by base exchange are iron, cobalt, silver, nickel and cerium, which introduction can be effected by trickling 5-10% solutions of salts of these elements repeatedly over the zeolite at room or somewhat elevated temperatures.

The zeolites described above are alkaline in character and may be used as such, or they may be treated with acid solutions in order to render them neutral or acid in character. This may be effected by spraying fragments of the zeolite with 10% sulfuric or nitric acid in an amount such that a sample of the leached zeolite when boiled with water no longer shows an alkaline reaction.

The contact masses as described above are filled into suitable converters, and dehydrogenated fluorenes, uniformly vaporized with air in the ratio of from 1:20 to 1:30, are passed over the contact mass at 370–400° C. Good yields of fluorenone of high purity are obtained.

Instead of neutralizing the alkalinity of the zeolite contact masses by means of relatively strong mineral acid solutions as described in the forepart of the example, they may be leached with very dilute acid solutions; for example, the zeolite may be placed on a nutsch filter and treated with ½ to 1½% solutions of the mineral acids such as hydrochloric or sulfuric acid, or, weak acids such as acetic acid may be used. A greater or less amount of exchangeable alkali is leached out, depending on the length of the treatment. Contact masses prepared in this manner may be used as described above with excellent results.

Example 7

The following mixtures are prepared:

(1) 22 parts of aluminum sulfate with 18 mols of water are dissolved in 100 parts of water, and aluminum hydroxide is precipitated out with ammonia water. The precipitate is then washed with 150–200 parts of water.

(2) 12 parts of $V_2O_5$ are dissolved in 5 N. KOH solution containing 24 parts of KOH, the solution being effected at 80–90° C.

(3) 60 parts of "Celite" brick refuse are suspended in 250 parts of water, and a solution containing 8 parts of ferric sulfate is added and ferric hydroxide is precipitated in the diluent by means of ½ N. KOH. The cake obtained is carefully washed free from the mother liquor. The aluminum hydroxide and potassium vanadate are mixed together to form a milky paste, which is then intimately kneaded with the impregnated "Celite" brick refuse and the product is then thoroughly mixed with 25 parts of 33° Bé. potassium waterglass. Thereupon the material is placed on a suction filter and washed with 100 parts of water, whereupon the cake is dried, preferably at temperatures below 100° C., and broken into small fragments. The granular material is impregnated with a 10% sulfuric acid solution in installments, the product being dried between each impregnation. A so-called salt-like body of the base exchange body is obtained, and is filled into a converter.

Dehydrogenated fluorenes are uniformly vaporized into an air stream in the ratio of 1:25 and passed over the contact mass at 370–450° C. Fluorenone is produced, together with some phthalic anhydride and maleic acid, which can be readily separated by well known methods. It is advantageous to use steam in the reaction as it exerts a favorable influence.

Example 8

15 parts of $V_2O_5$ are dissolved with a potassium hydroxide solution containing 200 parts of water to form potassium vanadate. 9.5 parts of sodium tungstate are dissolved in 35 parts of water, and are then mixed with the potassium vanadate and an amount of hydrochloric acid added such that the solution remains distinctly alkaline. The solution is then diluted with 600–700 parts of water, and 70–75 parts of a commercial waterglass solution diluted with an equal amount of water are added with vigorous agitation, the mixture being heated to 60–70° C. Thereupon dilute hydrochloric acid is added in small portions from time to time, care being taken that the reaction mixture remains distinctly alkaline. A gelatinous precipitate is obtained, which is pressed free from the mother liquor, dried and hydrated with water. The hydrated base exchange body is treated by trickling a 5% manganese chloride solution over it until a maximum of the exchangeable alkali is replaced by manganese oxide. The contact mass is then ready for use, and is filled into a converter.

Dehydrogenated fluorene vapors and oxidizing gases are passed over the contact mass at 350–500° C., the higher temperatures being used where the oxygen content of the oxidizing gases is kept low and the lower reaction temperatures being used when the oxygen content of the oxidizing gases is low. Good yields of fluorenone are obtained.

Example 9

18 parts of $V_2O_5$ are suspended in 200 parts of water acidulated with concentrated sulfuric acid, and are then reduced in a known manner to vanadyl sulfate, for example, by means of sulfur dioxide. The solution is boiled and concentrated to 150 volumes and divided into two portions in the ratio of 1:2. ⅓ of the vanadyl sulfate is treated with 10 N. potassium hydroxide solution to transform it into the coffee brown vanadite, and it is then mixed with a potassium aluminate solution prepared by dissolving 10 parts of aluminum oxide in the form of the freshly precipitated hydroxide in a 5 N. potassium hydroxide solution. 100 parts of infusorial earth are thoroughly mixed with the potassium aluminate and potassium vanadite mixture, and thereupon the remaining ⅔ of the vanadyl sulfate solution is added with vigorous agitation. A precipitate is obtained which is pressed, dried, broken into fragments, and then after hydration for a considerable period of time with water, is digested with a 5% copper sulfate solution, resulting in substituting part of the exchangeable alkali of the nonsilicious base exchange body by copper.

Thereupon the product is broken into fragments, calcined with 3–4% burner gases at 450° C., and is then ready for use.

Dehydrogenated fluorenes are uniformly vaporized into an air stream in the ratio of 1:25 and passed over the contact mass at 360–400° C. A fluorenone of high purity is obtained.

*Example 10*

21.5 parts of ferric chloride are dissolved in 300 parts of water and 80 parts of infusorial earth are stirred in. The suspension is then heated to 40–50° C., and a potassium vanadate solution containing 18.1 parts of $V_2O_5$ and 22.6 parts of KOH in 250 parts of water is added with vigorous agitation. The infusorial earth is uniformly impregnated with ferric vanadate, and is separated from the mother liquor by filtration and washed with 250 parts of cold water. 90.5 parts of 33° Bé. waterglass are diluted with 4–5 volumes of water and mixed with the impregnated infusorial earth with vigorous agitation in order to effect a uniform distribution. 60 parts of aluminum sulfate with 18 mols of water are dissolved in 200 parts of water, and a 10 N. potassium hydroxide solution is added to dissolve the aluminum hydroxide which is at first precipitated. The potassium aluminate solution thus formed is stirred into the suspension, and the mixture heated up to about 60° C. A gelatinous precipitate is obtained almost immediately, and is increased by the addition of 2 N. sulfuric acid. Care should be taken, however, that a weak alkalinity to phenolphthalein is retained. The stirring is continued for an hour, the mixture being gradually permitted to cool down to room temperature, and the gelatinous precipitate obtained is pressed, washed with 200 parts of water in small portions, dried at about 80° C., and broken into yellow fragments of suitable size which are filled into a converter where they may be subjected to a preliminary treatment with 4–6% burner gases at 450–500° C., followed by blowing with air.

Instead of using iron vanadate as the diluent in the zeolite, other catalytically active salts of acids of vanadium or other metals of the fifth and sixth groups of the periodic system may be used. Such salts are, for example, those of nickel, cobalt, manganese, copper, aluminum, titanium, silver, barium and calcium.

If desired the contact mass above described, in which the zeolite is diluted with a catalytically active diluent, may be coated or affixed to massive carrier fragments of natural or artificial origin, such as, for example, materials rich in $SiO_2$, for instance roughened fragments of quartz, flint, pumice, quartz filter stones, or artificial carriers such as, for example, tablets prepared from kieselguhr and waterglass, kieselguhr and potassium aluminate, kieselguhr and alkalies or alkali metal salts, and the like. Metal alloy carrier fragments may also be used, such as, for example, aluminum granules or roughened granules of ferrovanadium, ferromolybdenum, ferrosilicon, silicon ferromanganese, silicon aluminum ferromanganese, ferrotitanium, ferrotungsten and the like. These coated contact masses may be prepared by causing the waterglass-impregnated-infusorial earth suspension to adhere to the carrier and then forming the zeolite in situ by adding the aluminate solution or by spraying with an aluminum sulfate solution, in which case a zeolite of the aluminum double silicate type is formed.

A further class of very effective contact masses is obtained by leaching the zeolite above described with dilute acids to remove part or all of the exchangeable alkali. This may be effected by trickling ½ to 1% acid solutions over the zeolites, the extent of leaching being determined by the duration of treatment. After leaching the contact masses should be dried before using. Dehydrogenated fluorenes are vaporized into an air stream in the ratio of 1:20 and passed over the contact mass as described above at 340–450° C., fluorenone of excellent purity being obtained.

What is claimed as new is:

1. A method of oxidizing dehydrogenated fluorenes, which comprises vaporizing them, admixing the vapors with an oxidizing gas and passing the mixture at 340–500° C. over an oxidation contact mass.

2. A method of oxidizing dehydrogenated fluorenes, which comprises vaporizing them, admixing the vapors with an oxidizing gas and passing the mixture at 340–500° C. over an oxidation contact mass containing at least one metal element of the fifth and sixth groups of the periodic system.

3. A method of oxidizing dehydrogenated fluorenes, which comprises vaporizing them, admixing the vapors with an oxidizing gas and passing the mixture at 340–500° C. over an oxidation contact mass containing vanadium.

4. A method of oxidizing dehydrogenated fluorenes, which comprises vaporizing them, admixing the vapors with an oxidizing gas and passing the mixture at 340–500° C. over an oxidation contact mass containing at least one compound of a metal selected from the group alkali metals, alkaline earth metals.

5. A method of oxidizing dehydrogenated fluorenes, which comprises vaporizing them, admixing the vapors with an oxidizing gas and passing the mixture at 340–500° C. over an oxidation contact mass containing at least one compound of a metal selected from the group alkali metals, alkaline earth metals, and also containing at least one catalytically active component which is not a specific catalyst for the oxidation of dehydrogenated fluorenes to fluorenones.

6. A method according to claim 4 in which the contact mass contains at least one vanadium compound.

7. A method according to claim 5 in which the contact mass contains at least one vanadium compound.

8. A method of oxidizing dehydrogenated flourenes, which comprises vaporizing them, admixing the vapors with an oxidizing gas and passing the mixture at 340-500° C. over an oxidation contact mass containing at least one salt of a metal acid of the fifth and sixth groups of the periodic system.

9. A method of oxidizing dehydrogenated fluorenones, which comprises vaporizing them, admixing the vapors with an oxidizing gas and passing the mixture at 340-500° C. over an oxidation contact mass containing at least one salt of an acid belonging to the following group:—vanadate, vanadite, molybdate.

10. A method of oxidizing dehydrogenated fluorenes, which comprises vaporizing them, admixing the vapors with an oxidizing gas and passing the mixture at 340-500° C. over an oxidation contact mass containing a permutogenetic body.

11. A method of oxidizing dehydrogenated fluorenes, which comprises vaporizing them, admixing the vapors with an oxidizing gas and passing the mixture at 340-500° C. over an oxidation contact mass containing a diluted permutogenetic body.

12. A method of oxidizing dehydrogenated fluorenes, which comprises vaporizing them, admixing the vapors with an oxidizing gas and passing the mixture at 340-500° C. over an oxidation contact mass containing a permutogenetic body having associated therewith at least one catalytically active element in non-exchangeable form.

13. A method of oxidizing dehydrogenated fluorenes, which comprises vaporizing them, admixing the vapors with an oxidizing gas and passing the mixture at 340-500° C. over an oxidation contact mass containing a permutogenetic body having associated therewith vanadium.

14. A method of oxidizing dehydrogenated fluorenes, which comprises vaporizing them, admixing the vapors with an oxidizing gas and passing the mixture at 340-500° C. over an oxidation contact mass containing a permutogenetic body having associated therewith vanadium in non-exchangeable form.

15. A method according to claim 1 in which the reaction takes place in the presence of large amounts of steam in addition to that normally present.

16. A method according to claim 8 in which the reaction takes place in the presence of large amounts of steam in addition to that normally present.

17. A method according to claim 9 in which the reaction takes place in the presence of large amounts of steam in addition to that normally present.

18. A method of oxidizing dehydrogenated fluorenes, which comprises vaporizing them, admixing the vapors with an oxidizing gas and passing the mixture at 340-500° C. over an oxidation contact mass containing at least one vanadyl vanadate.

19. A method according to claim 18 in which the reaction takes place in the presence of large amounts of steam in addition to that normally present.

Signed at Pittsburgh, Pennsylvania this 12th day of December, 1928.

ALPHONS O. JAEGER.